(12) United States Patent
Farrugia et al.

(10) Patent No.: US 8,085,932 B2
(45) Date of Patent: Dec. 27, 2011

(54) SECURE DISTRIBUTION OF DATA OR CONTENT USING KEYLESS TRANSFORMATION

(75) Inventors: Augustin J. Farrugia, Cupertino, CA (US); Jean-Francois Riendeau, Santa Clara, CA (US); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 901 days.

(21) Appl. No.: 12/118,538

(22) Filed: May 9, 2008

(65) Prior Publication Data

US 2009/0279691 A1 Nov. 12, 2009

(51) Int. Cl.
*H04L 9/00* (2006.01)

(52) U.S. Cl. ............... 380/28; 380/29; 380/30; 380/44; 713/168; 713/176

(58) Field of Classification Search ............. 380/28–30, 380/44; 713/168, 176
See application file for complete search history.

(56) References Cited

U.S. PATENT DOCUMENTS

| 6,084,918 | A  | * | 7/2000 | Piret | 375/261 |
| 6,301,362 | B1 | * | 10/2001 | Matyas et al. | 380/37 |
| 2004/0168073 | A1 | * | 8/2004 | Bourne et al. | 713/193 |
| 2006/0190723 | A1 | * | 8/2006 | Benson | 713/165 |
| 2008/0037776 | A1 | * | 2/2008 | Akiyama et al. | 380/44 |

* cited by examiner

*Primary Examiner* — Thanhnga Truong
(74) *Attorney, Agent, or Firm* — Morrison & Foerster LLP

(57) ABSTRACT

A computer enabled method and apparatus for encrypting and decrypting data using a keyless transformation cryptographic technique. Data is protected using a keyless (unkeyed) complex mathematical transformation, in contrast to a traditional cryptographic algorithm using a secret key. This approach is resistant to both static analysis (hacking) performed on executable encryption/decryption code, as well as dynamic analysis performed during execution (runtime) of ciphering or deciphering. The method uses a family of asymmetric data transformations based on Galois field polynomials.

40 Claims, 2 Drawing Sheets

SECURE DISTRIBUTION OF DATA OR CONTENT USING KEYLESS TRANSFORMATION

FIELD OF THE INVENTION

This invention relates to distribution of data or content using a cryptographic system, and more specifically to a keyless cryptographic system.

BACKGROUND

Protection of digital data and content transferred between computers over a network is important for many enterprises. Enterprises attempt to secure this protection by implementing some form of digital rights management (DRM) process. The DRM process often involves encrypting the piece of content (e.g. encrypting the binary form of the content) in order to restrict usage to those who have been granted a right to the content. Content in this situation involves alphanumeric material, audio material such as music, and video material. It also involves, of course, combinations thereof.

Cryptography is the traditional method of protecting data in transit across a computer network. In its typical application, cryptography protects communications (messages) between two mutually trusting parties from thievery or hackers by attack on the data in transit. However, for many digital file transfer applications (e.g. for the transfer of audio or video content), instead the party that receives the content (i.e., the receiving party) might try to break the DRM encryption that the party that supplied the content (i.e., the distributing party) applied to the content. Thus in this case the receiver is not a trusted party per se, but the point is to protect the distributor who owns the content from its misuse by the receiving party. In addition, with the proliferation of network penetration attacks, a third party may well obtain access to the receiving party's computer and thus to the protected content.

In many DRM systems now in use, the weakest link in security is not the encrypted data (message) but rather cryptographic key management and handling and other aspects of the DRM system. As well known, modem cryptographic systems typically use keys which are strings of digital values for both encryption and decryption purposes. For instance, one of the more successful DRM systems, which distributes music online, requires that the receiving party's computer to maintain the unencrypted key for each piece of encrypted music in an encapsulation system called a "key bag" (repository) that is itself encrypted.

This approach also disadvantageously allows different devices to use different formats for their key bags. The use of different key bag formats for different devices further exposes the keys to penetration when the content is transferred between devices. It is also necessary to link a key bag to a device, to avoid unauthorized replication of DRM information.

The present disclosure is in the context of the so-called "white box" operation model. This relates to the so-called "black box" vs. "white box" approach according to how much a priori information is available to outsiders of the security system. A black box model is a system for which there is no a priori information available to the adversary. A white box model (also called glass box or clear box) is a system where all necessary information is available to outsiders. Most actual systems are somewhere between the black box and white box model, so this concept is intuitive rather than definitive. This means, in the cryptography or security field, that an adversary or hacker can access all of the assets or resources related to a given application (security system) except for the keys. In the white box situation, an adversary or hacker can use what is called static analysis on the executable code (which is a computer program which embodies the encryption system) to understand its behavior. This assumes in the white box model that the actual computer code is available to outsiders which typically is the case. Further in the white box situation, so called dynamic analysis can be performed during execution of the computer code, such as during encryption or decryption, to examine actual runtime values and thereby often extract sensitive data, such as cryptographic keys and proprietary algorithms.

A security system designed to resist dynamic analysis tries to make it difficult for the adversary to obtain significant runtime values. One way to achieve this is to hide the sensitive data relating to the cryptographic system by applying a transformation function to it. One possibility would be to use a traditional cryptographic algorithm, such as AES. However AES requires, as do most cryptographic algorithms, a secret key to operate it. In the white box model, there is no place to hide a secret key. Therefore typically the task becomes one of hiding the cryptographic key which may be difficult in certain types of systems.

In a typical DRM system, the pieces of encrypted digital content are maintained on a central server by the content owner or operator of the service. Users then download to their computer via the Internet particular pieces of content such as a song or a video program. The downloaded material is typically downloaded in encrypted form and the content key is transmitted also, often in a separate transmission. This is done for some form of payment. The user can then play the content by decrypting it on his computer or player. This process is transparent to the user if he has purchased an authorized piece of digital content, since the key accompanies the downloaded file and software installed on the user's computer decrypts the file. It is also possible for the user to download the digital file to a media player. Typically this second download is also performed in the encrypted state and then the decryption occurs upon playback in the player. Again this is transparent for properly purchased content. It is generally been found best if the decryption only occurs upon playback, for security reasons. Of course if the content key or details of the DRM system have been compromised as described above, that is published, anyone can access the song and transfers of the encrypted files to unauthorized users is easily accomplished and they can then apply the decryption key even though not authorized to do so.

Therefore, key management becomes very important and it is especially difficult to maintain key security in consumer type electronic devices where there is an intention to use cryptography, such as DRM systems as described above.

SUMMARY

In accordance with the present invention, it has been determined that it would be more effective to use a keyless cryptography system. Normally keyless cryptography is considered weak (insecure), since once the encryption algorithm is discovered the security is breached. It is an axiom of traditional cryptography that the cryptographic system should not be dependent upon the security or secrecy of algorithms, since there are relatively limited number of cryptographic algorithms which are known. Therefore traditional cryptography relies on keys as explained above, and making sure that keys are difficult to discover. However the present inventors have determined that for certain situations in the "white box" model situation it is more effective to implement an unkeyed (keyless) complex transformation instead of using a traditional cryptographic algorithm with a secret key.

Further, the present inventors have determined that by hiding the transformation it may also resist the static analysis approach by hackers. The present inventors recognize that this approach is not necessarily in conformance with traditional cryptography, but as explained above the present system has uses other than for traditional high security cryptography. Also, traditional cryptography does not address the issue of protecting keys. For instance, one use in accordance with this invention is to protect not necessarily the content, but the DRM information itself, such as the cryptographic content keys and other information. Thus in accordance with this approach, one transmits a partial state of the DRM information using a relatively weak encryption scheme, including a transformation which is keyless. This is in the context of an asymmetric cipher where a similar process is used for encryption and decryption but with different parameters. Unkeyed ciphers are known, but are normally considered weak in the field. This is because, as pointed out above, they rely only on the secrecy of the algorithm.

Advantageously, the present encryption system is relatively fast, that is it requires relatively little processor time to encrypt or decrypt and could be used for encryption content as well as for instance the DRM data. However, a cipher system such as disclosed here is relatively easier to penetrate if a large volume of either encrypted or decrypted data is made available to the hacker. Thus by limiting this data to the DRM information itself which is rather limited in volume, breaches are minimized. Moreover in one embodiment, the hardware or software recipient of the encrypted data is located relatively deep in the recipient system or device so the data is relatively hard to intercept using dynamic analysis. Thus for instance the normal security constraint of not relying on an algorithm for security can be relaxed if there are other security aspects present. For instance here in some embodiments, the recipient is an application (computer program or hardware module) which is a privileged part of the overall recipient device system not available to the outsider normally, but reserved for security purposes. This for instance may be a particular hardware module of the receiving device which is relatively hard to reach by outsiders.

Therefore in accordance with the present invention, there is a substantial advantage of using a keyless encryption system, while recognizing and compensating for, if needed, the relative weakness of the resulting encryption.

Briefly, the present encryption system uses a complex mathematical transformation of the clear text (unencrypted) data using Galois (finite) fields to encrypt. (It is assumed that the data here is in conventional digital form prior to encryption. Note that any type of data including audio, video, or alphanumeric is readily rendered into such digital form, as is conventional in the communication and computer fields.) In accordance with one embodiment of the present encryption method, two polynomials are determined. These polynomials are such that their product is equal to 1 modulo a third polynomial, called the modulus. (In mathematics, conventionally the value a modulus b is equal to the remainder of b divided by a.) The coefficients of each polynomial are used to build an M by M matrix. Thereby the encryption is relatively simple; to encrypt data, the data is multiplied by the coefficients of the first polynomial, resulting in the encrypted form of the data. The decryption process is complementary whereby to recovery the original data from the encrypted data, the encrypted data is multiplied by the coefficients of the second polynomial.

Several variants are possible. One is to embed the first polynomial into a given transmitting or sending application (computer program or device) and to embed the second polynomial into its counterpart recipient which is receiving the message. A second variant uses randomly generated first and second polynomials for hiding the data inside a single computer program or device. A third variation composes the present transformation with other types of non-linear transformation, such as substitutions, for a higher level of security.

In accordance with this disclosure contemplated is the method of encrypting the content as described above, and also the complementary method of decrypting same. Contemplated also is a method of transmitting the encrypted content and receiving the encrypted content and decrypting it. Also contemplated is a computer product, including a storage media storing computer code for carrying out the method of encrypting, and a computer product for carrying out the decrypting. Also contemplated is an apparatus for decrypting previously encrypted content, including a properly programmed player or computer. Also contemplated is an apparatus for encrypting the content which may reside in a central server, the apparatus including the server, and including software for carrying out the encryption.

DETAILED DESCRIPTION

Figure 1:
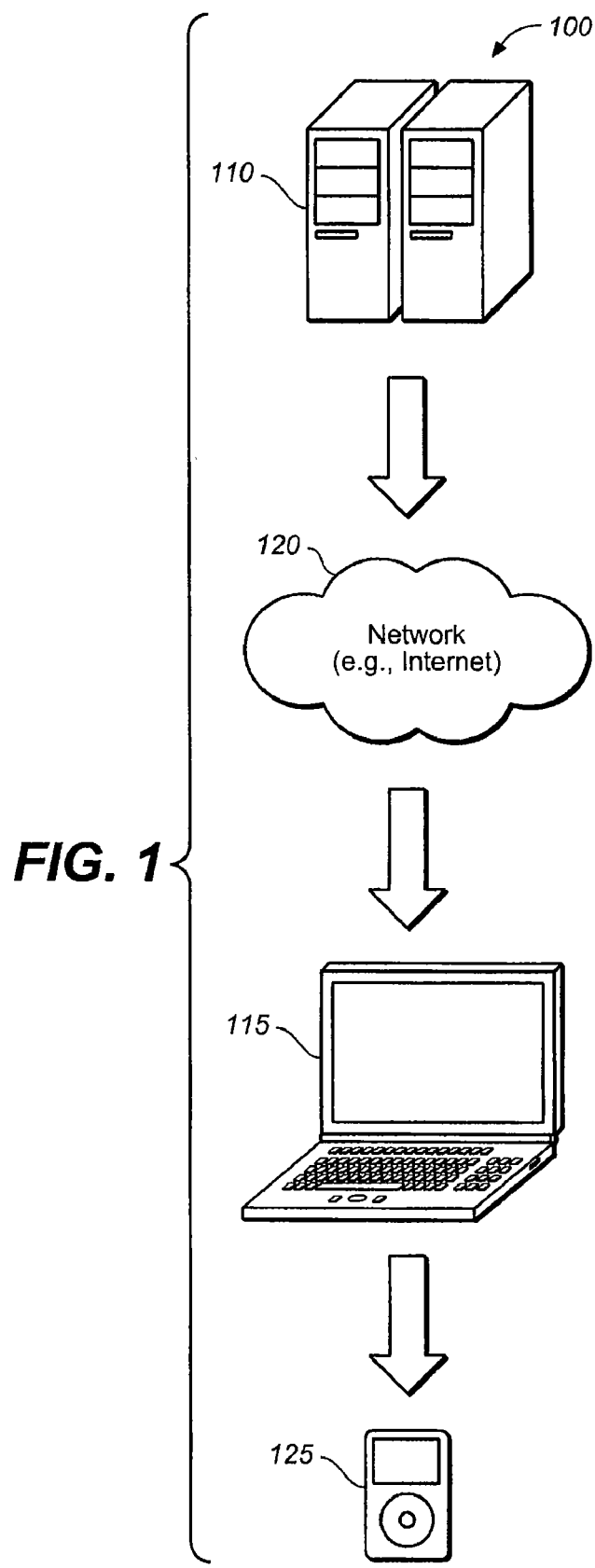
FIG. 1 shows a content distribution system in which environment the present method and apparatus may operate.

FIG. 1 illustrates a content distribution system 100 which is a conventional environment in which a method and apparatus in accordance with this invention may be employed. This is a well known system as described above, for instance for distribution of music, videos, etc. of which several types are now in commercial use. This content distribution system distributes content in a manner that protects the digital rights, and thereby ensures legal use of the content. The content distribution system 100 includes a DRM server (or set of servers) 110 and a content-receiving user device 115. Device 115 is typically a computer or equivalent. While only one user device 115 as shown in FIG. 1, the content distribution system 100 can serve many such devices in typical commercial embodiments. While FIG. 1 illustrates a user device 115 as a portable computer, it could for instance be a desktop computer, personal digital assistant (PDA), cell phone, an audio player, a video player or any other user device capable of receiving content online. The user device 115 connects to the DRM server set 110 through a computer network 120, such as a local area network, a wide area network or a network of networks such as the Internet.

Through the network connection, the user device 115 communicates with the set of DRM servers 110 to purchase, license, update or otherwise obtain content. While in some embodiments the DRM server set 110 sells or licenses content to user devices, in other embodiments this is not the case and the DRM server set 110 may simply enforce distribution of content to authorized user devices without financial exchange being involved.

In some embodiments, the DRM server set 110 includes a content caching server that provides encrypted content to a user device 115 through the network 120 after another server in the DRM server set 110 determines that the user device 115 can obtain the content, for instance it has been paid for. In certain embodiments, system 100 may include multiple caching servers to cache content at various locations on the network, to improve speed and efficiency of downloading across the network.

In accordance with this disclosure, the encrypted content is accompanied by DRM information encrypted as described here.

In some embodiments, the downloaded content is copied from the user device 115 into one or more other user devices. For instance, FIG. 1 illustrates the other user device 125 as a portable media player. Device 125 can be any device capable of utilizing the downloaded content. It may be a music player, video player, game console, camera, etc. The portable media player is typically connected to the user device 115 via a conventional local data connection, such as a universal serial bus (USB), IEEE 1394, infra-red, wireless connection or any other type of known connection. In most situations the computer device 115 can itself play the content, or it can be used as an intermediary to download to player 125. Use of the intermediary device 115 is typically because most players 125 currently do not have the requisite user interface or Internet connectability for downloading content. However it is contemplated in the future they will and in that case the intermediary computer 115 may be dispensed with. Thus the decryption and playback of the content (and its associated DRM information) may take place either at the computer device 115 or the user device 125.

It is recognized that the present encryption does not conform to usual standards for secure encryption. This is because once the algorithm or process for the transformation is known, it is relatively easy for a hacker to penetrate it. However as noted above, the present encryption is not for the standard type of secure encryption, for instance for financial transactions, but instead is meant to be used in the context of mass distribution of music and audio files and for protecting certain DRM related information or other information, which may be relatively hard for the hacker to access due to system architecture.

The present encryption method uses a family of asymmetric data transformations based on polynomials over a Galois field. A Galois field is an algebraic field that has a finite number of elements. The number of elements is always of the form $p^n$, where p is a prime number called the field characteristic and n is a positive integer. The Galois field is a type of finite field, named after the mathematician Évariste Galois. Finite fields are well known in number theory, algebraic geometry, cryptography and coding. Finite fields are defined as being completely known. Finite fields are classified as follows. For every prime number p and integer $n \geq 1$, there exists a finite field with $p^n$ elements. Any two finite fields with the same number of elements are isomorphic, that is their addition tables are essentially the same and their multiplication tables are essentially the same. The notation used here for Galois fields is $GF(p^n)$. Another common notation is $F(p^n)$. Also well known in the field of cryptography is the use of polynomials with coefficients from $GF(p^n)$. Note that computations using Galois fields are readily carried out by suitable computer software or hardware.

As an example of a Galois field, there exists a finite field $GF(4)=GF(2^2)$ with 4 elements, and every field with 4 elements is isomorphic to this one. There is also a finite field $GF(8)=GF(2^3)$ with 8 elements, and every field with 8 elements is isomorphic to this one. Note for instance, there is no finite field with 6 elements, because 6 is not a power of any prime number.

In the following description, M is the order of the transformation (i.e., the number of bytes of data that it can transform). For practical reasons, M is chosen to be a power of 2. Note that a message or file is conventionally partitioned into a number of bytes. The message also can be divided up into sub-messages, each of which can be enciphered separately. Therefore, the present method is not limited to any particular length of message or data to be encrypted or decrypted.

Furthermore, for the case where the field characteristic is 2, define the polynomial $R(x)=x^M+1$ where x is a variable. Polynomial $R(x)=x^M-1$ if the field characteristic is not 2. Let $P(x)$ and $Q(x)$ be the two polynomials of degree M−1 over $GF(2^n)$, such that $P(x)*Q(x)=1 \pmod{R(x)}$. The degree refers to the highest power of the variable expressed in the polynomial. A polynomial is a function of a variable such as x and a number of coefficients Pi, each coefficient being associated with one of the powers of the variable, from 0 to M−1. For instance, $$P(x)=p_0+p_1 x+p_2 x^2+\ldots+p_{M-1} x^{M-1}$$

Further, define MP as the matrix defined by the coefficients of polynomial P as follows:

$$\begin{bmatrix} p_0 & p_{M-1} & \cdots & p_1 \\ p_1 & p_0 & \cdots & p_2 \\ \cdots & \cdots & \cdots & \cdots \\ p_{M-1} & p_{M-2} & \cdots & p_0 \end{bmatrix}$$

Then let MQ be the matrix similarly defined by the coefficients of the second polynomial Q:

$$\begin{bmatrix} q_0 & q_{M-1} & \cdots & q_1 \\ q_1 & q_0 & \cdots & q_2 \\ \cdots & \cdots & \cdots & \cdots \\ q_{M-1} & q_{M-2} & \cdots & q_0 \end{bmatrix}$$

Next consider a data element D (this is the data to be encrypted) composed of M items of N bits each. Typically M is the number of bytes in the data element D, each composed of for instance 8 bits. In order to transform the data element D, one first considers D as a vector of M entries in $GF(2^n)$, then performs the matrix multiplication E=MP*D. In other words in order to encipher file or message D, one multiples file or message D by the matrix MP formed by the coefficients of polynomial P to arrive at file E (the encrypted file). Typically each matrix here is an M by M matrix, that is M rows by M columns. This provides the encryption.

In order to recover the original message D in unencrypted form at the receiving end or recipient, one multiples the received encrypted message E by the matrix MQ formed by the coefficients of the second polynomial Q, so for encryption D=MQ*E. Therefore the encryption is a relatively simple matrix multiplication using the coefficients of the first polynomial and the decryption is a similarly relatively simple complementary calculation using the coefficients of the second polynomial.

As pointed out above, several variants are possible. The first variant is to embed the first set of polynomial coefficients P into a given application (computer program) and then to embed the second set of polynomial coefficients Q coefficients into the recipient. Thus typically the transmitting end would have matrix MP and the recipient end matrix MQ. This is a static scheme having the advantage of using different polynomials in each application, thereby heightening security.

A second variant uses randomly generated polynomials P and Q for hiding data inside a single application (computer program or device). For instance, a secure hardware or software module in a device could apply the transformation to a concrete data element before returning an abstract handle on the element outside of the module. Whenever the abstract handle reenters the secure module, it is untransformed and the concrete data element is recovered.

A third variant applies, on top of the present transformation, a second non-linear transformation, such as substitutions of the type well known in the cryptography field. If chosen carefully, the other non-linear transformation can improve the transformation of weak data entries, such as $(0, 0, \ldots, 0)$ which is unfortunately transformed in accordance with the above described system to $(0, 0, \ldots, 0)$. Thereby in order to avoid breaches in security due to such weak entries (in the clear text), the imposition of a second non-linear transformation would be helpful.

$D = D_0, \ldots, D_{M-1}$ can be used in random order as input to matrix MP. After computing matrix MQ, the reverse operation of random order has to be applied to recover the right result. It is also possible to combine this with other M values, such as matrix $MP_1$ in $GF(2^8)$, and $MP_2$ in $GF(3^{16})$ To encrypt, use $E = MP_2 \cdot MP_1 * D$;

To decrypt, use $D = MQ_1 \cdot MQ_2 * E$, where $(f \cdot g)(x) = g(f(x))$

Figure 2:
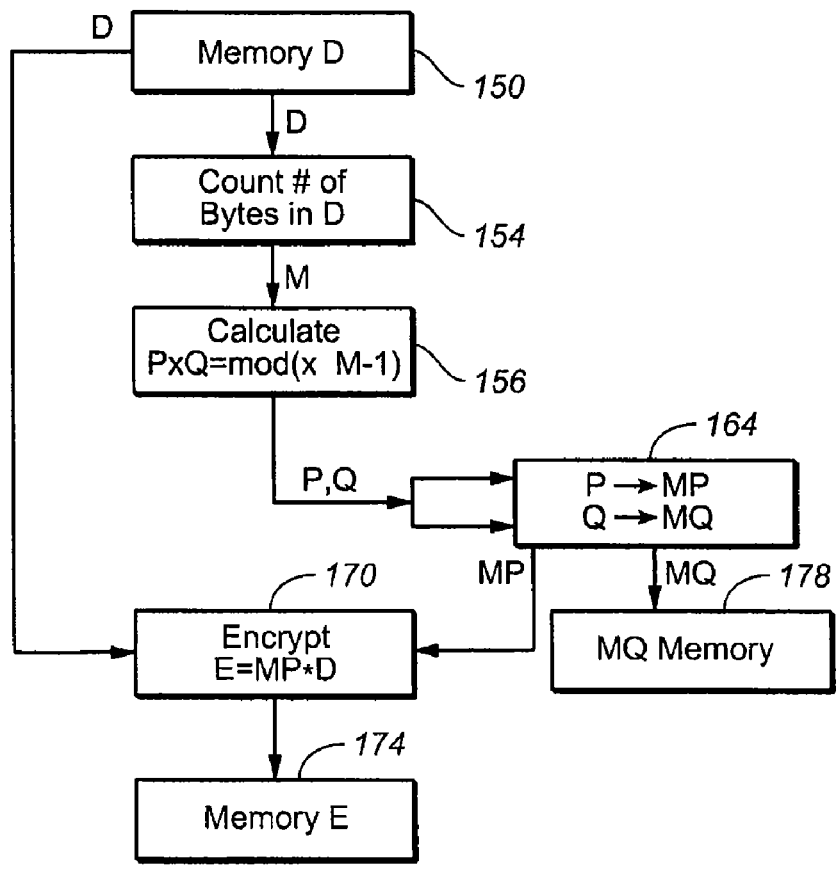
FIG. 2 shows a method and associated apparatus in accordance with this invention for encrypting.

FIG. 2 shows a method and the associated apparatus in accordance with this disclosure for encryption. This is typically carried out in the context of a computer or computing device or equivalent circuitry (hardware), where such a computer is properly programmed and may be associated with servers 110. Coding the appropriate computer programs (for instance, in the "C" language) for the encryption function and the decryption function (or embodying the calculations in computer hardware, or a combination thereof) is routine in light of this disclosure and the well known aspects of DRM systems.

In FIG. 2 there is a data storage element 150, typically a computer memory, which holds the unencrypted file D, typically a data file (message) in standard digital form. The unencrypted file D, or a part thereof, is coupled to element 154, which determines the number M of bytes present in D. If the message length is excessive, of course, the message may be broken up into several sub-messages. The value of M is then transmitted to the calculation element 156, which calculates $P(x)*Q(x) = 1 \mod (x^M - 1)$, x being a variable, and where the coefficients of P and Q are calculated as described above. The resulting coefficients of polynomials P and Q are then transmitted to a storage 164, which stores the matrix values MP and MQ relating to respectively P and Q. Then at the next element 170, the value of D is encrypted using the calculation $E = MP*D$. The resulting value of E (the encrypted message) is then stored in the memory 174. The coefficients of matrix MQ are stored in memory 178.

Figure 3:
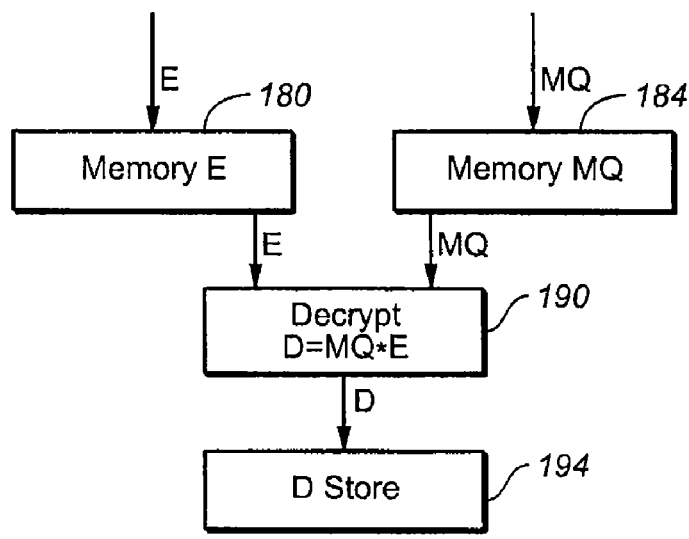
FIG. 3 shows a method and associated apparatus in accordance with this invention for decrypting.

The associated decryption method and apparatus, which are complementary to that of FIG. 2, are shown in FIG. 3. While the activity of FIG. 2 typically takes place at the head end or server 110 shown in FIG. 1, the activity of FIG. 3 takes place in computer 115 and/or player 125. However in other respects, it is essentially complementary. As shown, data storage 180, 184 is typically memory in the computer 115 or in the player 125, which stores data received over network 120 from the servers 110 shown in FIG. 1. The received encrypted file E is stored in the memory (storage) 180. (This is the encrypted file as received typically from the encryption apparatus shown in FIG. 2.) The associated matrix MQ is also received along a similar or different channel, depending on the security level. This matrix MQ is stored in memory 184. Then the values of E and MQ are passed to the decryption element 190, which calculates the decrypted file D as shown. The recovered decrypted file D is then stored in its own memory 194 to be used as needed.

This disclosure is illustrative and not limiting, further modifications will be apparent to one skilled in the art in light of this disclosure and are intended to fall within the scope of the appended claims.

What is claimed:

1. A method for encrypting data in a computing device, comprising the acts of:
   providing the data;
   storing the data in a first data storage element;
   providing first and second polynomials each of degree M−1, M being a positive integer equal to a number of bytes in the data, where a product of the two polynomials equals 1 (mod ($x^M$−1)), x being a variable; and
   storing the coefficients of the first polynomial in a second data storage element;
   transforming the data by multiplying it by the coefficients of the first polynomial, thereby encrypting the data without requiring a key; and
   storing the encrypted data in a third data storage element.

2. The method of claim 1, wherein the transformation is a finite field transformation.

3. The method of claim 1, wherein the coefficients of the first polynomial are expressed as a matrix having M columns and M rows.

4. The method of claim 1, further comprising the act of:
   transforming the encrypted data by multiplying it by the coefficient of the second polynomial, thereby restoring the data to a decrypted form.

5. The method of claim 1, further comprising the acts of:
   providing the first polynomial in a first computer program; and
   providing the second polynomial in a second computer program.

6. The method of claim 1, further comprising the acts of:
   randomly generating the first and second polynomials in one computer program.

7. The method of claim 1, further comprising the acts of:
   providing an additional data transformation; and
   composing the method of claim 1 with the additional data transformation.

8. A non-transitory computer readable medium holding computer code for carrying out the method of claim 1.

9. An encrypted file stored in the third data storage element and generated by the method of claim 1.

10. The method of claim 1, further comprising the act of using the encrypted data as digital rights management information to secure content.

11. The method of claim 1, further comprising the acts of:
    providing an additional set of polynomial coefficients; and
    wherein transforming the data includes also multiplying the data by the additional set of coefficients.

12. An encryption computing device comprising: a first data storage element for holding data; a second data storage element for holding coefficients of first and second polynomials each of degree M−1, M being a positive integer equal to a number of bytes in the data, where a product of the two polynomials equals 1 (mod($x^M$−1)), x being a variable; and a calculation unit operatively coupled to the first and second data storage elements, and multiplying the data by the coefficients of the second polynomial, and outputting the data in encrypted form without requiring a key; wherein when the encrypted data is multiplied by the coefficients of the second polynomial, the data is restored to a decrypted form.

13. The computing device of claim 12, wherein the transformation is a finite field transformation.

14. The computing device of claim 12, wherein the coefficients of the first polynomial are expressed as a matrix having M columns and M rows.

15. The computing device of claim 12, wherein:
the first polynomial is in a first computer program; and
the second polynomial is in a second computer program.

16. The computing device of claim 12, wherein:
the first and second polynomials are randomly generated in one computer program.

17. The computing device of claim 12, further comprising an element for:
providing an additional data transformation; and
composing the encryption of claim 14 with the additional data transformation.

18. A non-transitory computer readable medium holding computer code for the computing device of claim 12.

19. An encrypted file stored in a third data storage element and generated by the computing device of claim 12.

20. The computing device of claim 12, wherein the encrypted data is digital rights management information to secure content.

21. The computing device of claim 12, wherein the second data storage element further holds an additional set of polynomial coefficients; and wherein the calculation unit also multiplies the data by the additional set of coefficients.

22. A method for decrypting data in a computing device, comprising the acts of:
providing encrypted data;
storing the encrypted data in a first data storage element;
providing first and second polynomials each of degree M−1, M being a positive integer equal to a number of bytes in the encrypted data, where a product of the two polynomials equals 1 (mod ($x^M$−1)), x being a variable; and
storing the coefficients of the first polynomial in a second data storage element;
transforming the encrypted data by multiplying it by the coefficients of the second polynomial, thereby decrypting the data without requiring a key; and
storing the decrypted data and third data storage element.

23. The method of claim 22, wherein the transformation is a finite field transformation.

24. The method of claim 22, wherein the coefficients of the second polynomial are expressed as a matrix having M columns and M rows.

25. The method of claim 22, further comprising the acts of:
transforming the decrypted data by multiplying it by the coefficients of the first polynomial, thereby restoring the data to an encrypted form.

26. The method of claim 22, further comprising the acts of:
providing the first polynomial in a first computer program; and
providing the second polynomial in a second computer program.

27. The method of claim 22, further comprising the acts of:
randomly generating the first and second polynomials in one computer program.

28. The method of claim 22, further comprising the acts of:
providing an additional data transformation; and
composing the method of claim 22 with the additional data transformation.

29. A non-transitory computer readable medium holding computer code for carrying out the method of claim 22.

30. A decrypted file stored in the third data storage element and generated by the method of claim 22.

31. The method of claim 22, further comprising the act of using the decrypted data as digital rights management information to secure content.

32. An decryption computing device comprising: a first data storage element for holding encrypted data; a second data storage element for holding coefficients of first polynomial of degree M−1, M being a positive integer equal to a number of bytes in the encrypted data, where a product of the first polynomial and a second polynomial equals 1 (mod($x^M$−1)), x being a variable; and a calculation unit operatively coupled to the first and second data storage elements, and multiplying the data by the coefficients of the second polynomial, and outputting a decrypted form of the data without requiring a key; wherein when the decrypted data is multiplied by the coefficients of the first polynomial, the data is restored to an encrypted form.

33. The computing device of claim 32, wherein the transformation is a finite field transformation.

34. The computing device of claim 32, wherein the coefficients of the first polynomial are expressed as a matrix having M columns and M rows.

35. The computing device of claim 32, wherein:
the first polynomial is in a first computer program; and
the second polynomial is in a second computer program.

36. The computing device of claim 32, wherein:
the first and second polynomials are randomly generated in one computer program.

37. The computing device of claim 32, further comprising an element for:
providing an additional data transformation; and
composing the decryption of claim 32 with the additional data transformation.

38. A non-transitory computer readable medium holding computer code for the computing device of claim 32.

39. A decrypted file stored in a third data storage element and generated by the computing device of claim 32.

40. The computing device of claim 32, wherein the decrypted data is digital rights management information to secure content.

* * * * *